(12) United States Patent
Mäkelä et al.

(10) Patent No.: US 7,603,235 B2
(45) Date of Patent: Oct. 13, 2009

(54) ARRANGEMENT FOR COLLISION PREVENTION OF MINE VEHICLE

(75) Inventors: Hannu Mäkelä, Tottijärvi (FI); Thomas Von Numers, Grankulla (FI)

(73) Assignee: Sandvik Tamrock Oy, Tampere (FI)

( * ) Notice: Subject to any disclaimer, the term of this patent is extended or adjusted under 35 U.S.C. 154(b) by 273 days.

(21) Appl. No.: 10/550,310

(22) PCT Filed: Mar. 25, 2004

(86) PCT No.: PCT/FI2004/000174

§ 371 (c)(1),
(2), (4) Date: Sep. 22, 2005

(87) PCT Pub. No.: WO2004/086084

PCT Pub. Date: Oct. 7, 2004

(65) Prior Publication Data

US 2006/0190124 A1 Aug. 24, 2006

(30) Foreign Application Priority Data

Mar. 25, 2003 (FI) .................... 20030449

(51) Int. Cl.
*G08G 1/16* (2006.01)
*G06F 17/00* (2006.01)
*G05B 15/00* (2006.01)

(52) U.S. Cl. .............. 701/301; 701/1; 701/2; 701/23; 701/24; 701/25; 701/26; 701/27; 701/200; 701/201; 701/202; 701/300; 700/213; 700/245; 700/253; 700/255; 700/258; 700/259; 340/435; 340/436; 340/539.22; 340/539.23; 340/901; 340/903; 340/988; 180/167; 180/168; 180/232; 180/271

(58) Field of Classification Search ............... 701/1, 701/2, 23–28, 200–202, 300, 301; 700/213, 700/245, 253, 255, 258, 259; 340/435, 436, 340/539.22, 539.23, 901, 903, 988; 180/232, 180/271, 167, 168
See application file for complete search history.

(56) References Cited

U.S. PATENT DOCUMENTS

| | | | |
|---|---|---|---|
| 4,809,178 A * | 2/1989 | Ninomiya et al. ........... 701/200 |
| 4,920,520 A * | 4/1990 | Gobel et al. ................. 367/99 |
| 5,400,244 A * | 3/1995 | Watanabe et al. ............. 701/28 |
| 5,530,330 A | 6/1996 | Baiden et al. |
| 5,572,428 A | 11/1996 | Ishida et al. |

(Continued)

FOREIGN PATENT DOCUMENTS

EP 1176393 A2 1/2002

(Continued)

*Primary Examiner*—Jack W. Keith
*Assistant Examiner*—Chuong P Nguyen
(74) *Attorney, Agent, or Firm*—Drinker Biddle & Reath LLP

(57) ABSTRACT

A mine vehicle and a method of preventing a mine vehicle from colliding. The mine vehicle (1) includes at least one scanner (13, 14) to scan the environment in front of the vehicle. On the basis of the scanning, an obstacle-free route is determined whose outermost points in a sideward direction are stored as memory points (21). At least one sideward safe area (15b) has been predetermined around the vehicle (1). A control system checks that no memory point (21) resides within the safe area (15b).

12 Claims, 2 Drawing Sheets

U.S. PATENT DOCUMENTS

| | | | | |
|---|---|---|---|---|
| 5,587,929 A * | 12/1996 | League et al. | ............... | 342/159 |
| 5,612,883 A * | 3/1997 | Shaffer et al. | ............... | 701/300 |
| 5,758,298 A * | 5/1998 | Guldner | ...................... | 701/23 |
| 5,923,270 A * | 7/1999 | Sampo et al. | ............... | 340/988 |
| 5,956,250 A * | 9/1999 | Gudat et al. | ................ | 701/26 |
| 5,999,865 A | 12/1999 | Bloomquist et al. | | |
| 6,055,042 A | 4/2000 | Sarangapani | | |
| 6,151,539 A * | 11/2000 | Bergholz et al. | ............. | 701/25 |
| 6,163,745 A | 12/2000 | Purchase et al. | | |
| 6,349,249 B1 | 2/2002 | Cunningham | | |
| 6,393,362 B1 | 5/2002 | Burns | | |
| 6,642,839 B1 * | 11/2003 | Gunderson et al. | .......... | 340/435 |
| 6,694,233 B1 * | 2/2004 | Duff et al. | .................... | 701/23 |

FOREIGN PATENT DOCUMENTS

| | | | |
|---|---|---|---|
| WO | 02/30792 A2 | 4/2002 | |
| WO | WO 02/093282 A1 * | 11/2002 | |

* cited by examiner

ARRANGEMENT FOR COLLISION PREVENTION OF MINE VEHICLE

FIELD OF THE INVENTION

The invention relates to a method of preventing a mine vehicle from colliding, the mine vehicle comprising at least: a movable carrier that may be driven in a first movement direction and in a second movement direction, at least one scanner, and a control system including at least a first control unit arranged on the carrier; the method comprising: determining for the mine vehicle at least one safe area provided within an area between minimum distances and maximum distances determined with respect to the vehicle; scanning the environment in front of the vehicle when driving the vehicle in one movement direction; carrying out a first collision examination wherein the safe area in front of the vehicle is monitored, and issuing a collision warning message if an obstacle is detected within the safe area.

The invention further relates to a mine vehicle comprising at least: a movable carrier that may be driven in a first movement direction and in a second movement direction, at least one scanner, and a control system including at least a first control unit arranged on the carrier; and wherein at least one scanner is configured to scan the environment in front of the vehicle in order to detect obstacles; wherein at least one safe area defined by minimum distances and maximum distances determined with respect to the vehicle is determined in the control system; and which control system is configured to monitor scanning results and to issue a collision warning message if an obstacle is detected within the safe area in front of the vehicle.

BACKGROUND OF THE INVENTION

An unmanned mine vehicle may be driven in a mine automatically along a predetermined route, controlled by a control system or, alternatively, an operator may drive a vehicle in a remote-controlled manner from a control room on the basis of camera observations. Since mine galleries are usually of a limited size, a danger exists that while travelling along its route, the mine vehicle may collide with a mine wall or with other obstacles on its route. It is well known to equip an unmanned mine vehicle with a scanner and monitor an area of a predetermined size in front of the vehicle. If an obstacle is detected within this area, an alarm will be given and the vehicle stops automatically. However, it is possible to provide the mine vehicles with only a limited number of scanners, which means that depending on the structure and shapes of the vehicle, there will still be some unmonitored "blind" areas in the vehicle.

BRIEF DESCRIPTION OF THE INVENTION

An object of the invention is to provide a novel and improved arrangement for collision prevention of a mine vehicle.

The method of the invention is characterized by determining also at least one sideward safe area for the vehicle, determining an obstacle-free route on the basis of scanning results, and determining points in a sideward direction of the vehicle to restrict the route; forming memory points on the basis of coordinates of the points restricting the route, and storing the memory points in the control system; and carrying out a second collision examination wherein at least one sideward safe area of the vehicle is monitored, and issuing a collision warning message if even one of the memory points resides within the safe area being monitored.

The mine vehicle of the invention is characterized in that in the control system, at least one safe area in a sideward direction of the vehicle is further determined, that the control system allows several memory points including their position information to be stored therein, and that the control system is configured to monitor at least one sideward safe area of the vehicle and to issue a collision warning message if even one of the memory points resides within the safe area being monitored.

An idea underlying the invention is that a mine vehicle includes at least one scanner configured to monitor the environment in front of the mine vehicle when the mine vehicle is driven to one movement direction. For a collision examination to be carried out in the control system of the vehicle, at least one safe area in a driving direction and at least one sideward safe area have been determined that have minimum distances and maximum distances of preplanned lengths from the vehicle. The locations on both sides of the vehicle of the closest detection points in a sideward direction, i.e. obstacles, obtained as a result from scanning are stored as memory points in the control system of the mine vehicle. The memory points determine an obstacle-free route in to the control system, and the control system remembers the shapes of the route at least for a section corresponding to the length of the vehicle. In a collision examination to be carried out, it is thus first checked that the scanning does not detect an obstacle within a safe area in front of the vehicle. Secondly, the collision examination includes that the control system monitors the vehicle and issues a collision warning message if even one of the memory points resides within the sideward safe area being monitored.

An advantage of the invention is that the vehicle no longer includes unmonitored sections as far as the collision examination is concerned, even if the number of scanners were limited and even if the shapes and structure of the mine vehicle were complex.

The idea underlying an embodiment of the invention is that a collision examination is utilized in adjusting the control parameters of a mine vehicle. This enables potential overstepping of the safe area due to steering movements and the resulting disturbances to a production run to be avoided in advance.

The idea underlying an embodiment of the invention is that the control system includes a ring buffer wherein the coordinates of the memory points are stored. When the vehicle is driven in a first movement direction, memory points with respect to the movement of the vehicle that have been produced by a first scanner are updated in the control system for a collision examination.

BRIEF DESCRIPTION OF THE DRAWINGS

The invention will be described in closer detail in the accompanying drawings, in which.

For the sake of clarity, the figures show the invention in a simplified manner. Like reference numerals identify like elements.

DETAILED DESCRIPTION OF THE INVENTION

Figure 1:
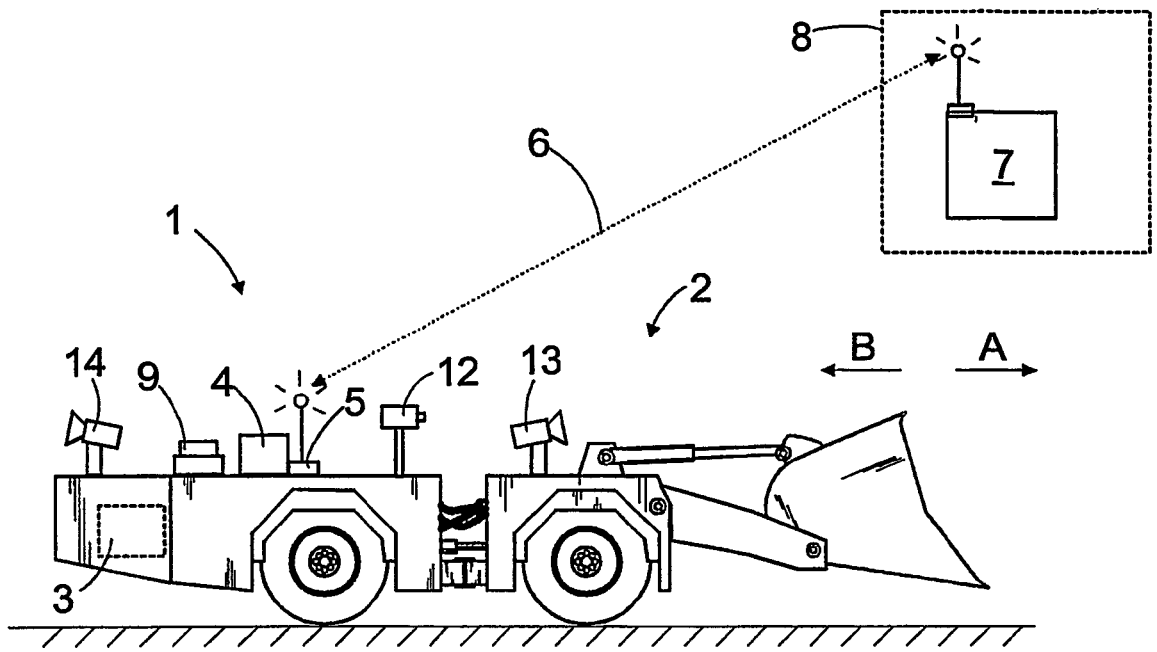
FIG. 1 is a schematic side view showing a mine vehicle according to the invention.

FIG. 1 shows a mine vehicle 1 which in this case is a loading vehicle having a bucket at the front for carrying and loading mined material. Alternatively, the mine vehicle 1 may be e.g. a rock drilling rig or a transport vehicle equipped with a platform. The mine vehicle 1 comprises a movable carrier 2 arranged to be moved by a motor 3 through power transmission and wheels. The mine vehicle 1 may also be equipped with a control system including at least a first control unit 4 which is located on the carrier 2 and which is e.g. configured to control the actuators in the mine vehicle 1 in order to steer and use the vehicle. The unmanned mine vehicle 1 may further include a data transfer unit 5 enabling the first control unit 4 to establish a data transmission connection 6 with a second control unit 7 external to the mine vehicle 1. The second control unit 7 may be situated in a control room 8 possibly arranged outside the mine. The control units 4 and 7 may be computers or corresponding devices. The control system may further include navigation equipment 9 for determining the position of the mine vehicle 1.

Figure 2:
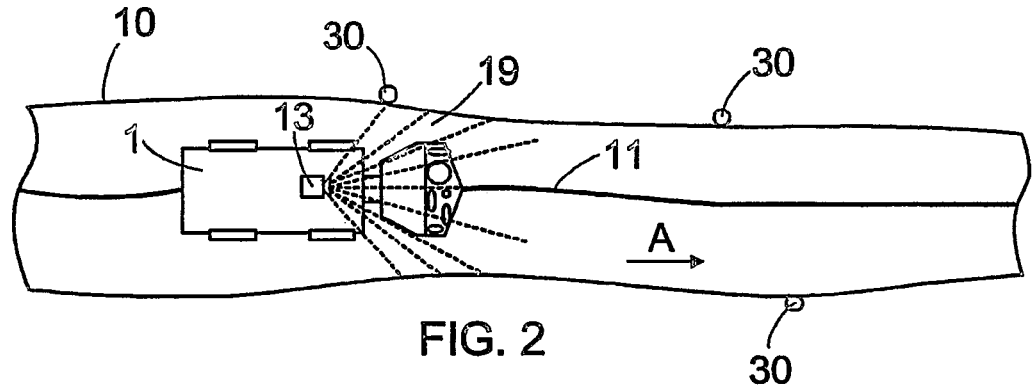
FIG. 2 is a schematic top view showing a mine vehicle of the invention.

FIG. 2 shows a mine vehicle 1, which may be arranged to travel in a mine gallery 10 along a predetermined route 11. The route 11 may be provided by driving the vehicle 1 in the mine manually while at the same time storing the directions and travelled distances of the vehicle 1 as an electronic map in the control system. For this purpose, the control system is provided with an X,Y coordinate system describing the working space of the vehicle 1. For the determination of a direction, the navigation equipment 9 may include e.g. a gyroscope or a corresponding device. The travelled distance, in turn, may be measured e.g. from the power transmission or wheel of the vehicle 1 in a manner known per se. In automatic drive, the control system may control the mine vehicle 1 along the taught route 11. At necessary intervals, the position may be checked to ensure that the vehicle 1 is on the route 11.

Alternatively, the unmanned mine vehicle 1 may be remote-controlled manually e.g. from the control room 8. In such a case, the mine vehicle 1 is equipped with at least one video camera 12, from which data is delivered to an operator in the control room 8. The control room may be provided with control means to enable the operator, based on a video image, to steer the mine vehicle 1 along a desired route. The data transmission connection 6 between the control room 8 and the control unit 4 may be based e.g. on a radio telephone system.

Yet another alternative for controlling an unmanned mine vehicle in a mine is to provide, in advance, the mine with appropriate reference points 30, such as reflectors, light sources, sound sources or the like. The mine vehicle 1 then includes a scanner or a corresponding device to enable the reference points 30 to be identified so as to position the vehicle 1.

According to the invention, the mine vehicle 1 is equipped with a collision prevention system for ensuring that the vehicle dos not collide with external obstacles. The system includes at least one or more first scanners 13 arranged at the front part of the vehicle 1 to enable the environment in front of the vehicle 1 to be scanned when the vehicle 1 is driven forward, i.e. in a first movement direction A. The system may further include at least one second scanner 14 situated at the rear of the mine vehicle 1 to enable the space behind the vehicle 1 to be scanned when the vehicle reverses, i.e. is driven in a second movement direction B. The number of both scanners 13 and 14 may be more than one. The scanners may be laser scanners, ultrasound scanners or corresponding devices that enable the space around the mine vehicle to be examined.

Figure 3:
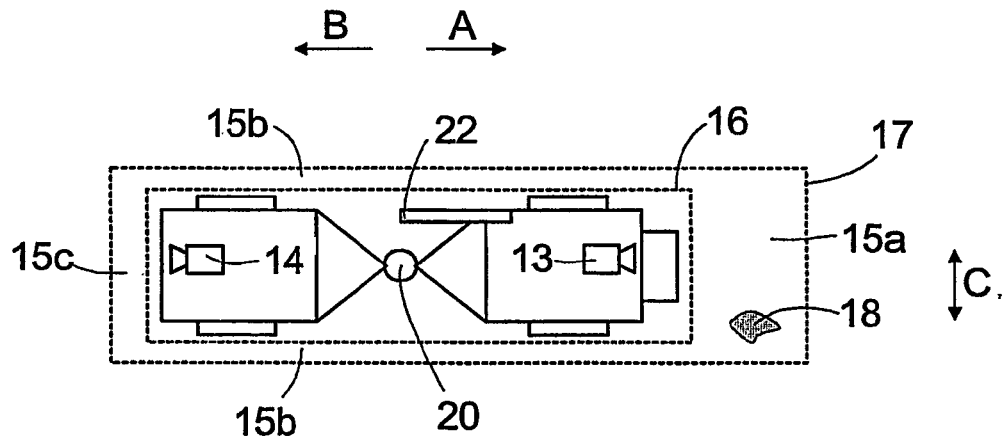
FIG. 3 is a schematic top view showing safe areas of a mine vehicle of the invention, and FIG. 4 schematically shows how a control system of a vehicle is provided with memory points of the invention.

As can be seen in FIG. 3, safe areas 15a to 15c may be determined for a collision examination. The size of the safe areas 15a and 15c in a driving direction may be different in the first movement direction A and in the second movement direction B. Furthermore, the safe area 15b may be of a different size in a sideward direction C than in the movement directions A and B. The safe areas 15a to 15c comprise minimum distances 16 and maximum distances 17 determined with respect to the vehicle 1. A minimum distance 16 may be determined according to the mine vehicle's 1 own dimensions, i.e. in practice it depends on the external shapes and structure of the vehicle 1. The use of minimum distances 16 enables false alarms due to the vehicle's 1 own structures, such as movements of a boom, bucket, etc., to be prevented. The maximum distances 17, in turn, determine the locations of the outer edges of the safe areas 15a to 15c. When dimensioning the maximum distances 17, the dimensions of mine galleries 10, the measures and structure of the vehicle 1, driving speed, circumstances and, further, safety-related aspects are taken into account. It is to be noted that the shapes of the boundaries formed by the minimum distances 16 and the maximum distances 17 do not necessarily have to be orthogonal but the boundaries may be determined point by point.

A first collision examination in practice takes place such that when the vehicle 1 moves in the mine in the first movement direction A, the environment in front of the vehicle 1 is scanned by the first scanner 13 and, correspondingly, when driving in the second movement direction B, the environment is scanned by the second scanner 14. If, on the basis of the scanning, the control system detects that an external obstacle 18 resides within the safe area 15a, the system issues a collision warning message. On the basis of the collision warning message, the mine vehicle 1 may be stopped immediately and further, the control room 8 may be notified of this. Obstacles located farther than the maximum distance 17 of the safe area 15a do not cause a collision warning message since such obstacles do not cause a danger of collision. A detection of an obstacle 18 within the safe area 15a may be confirmed by several detections prior to issuing a collision warning message. This enables false collision warning messages to be avoided.

Figure 4:
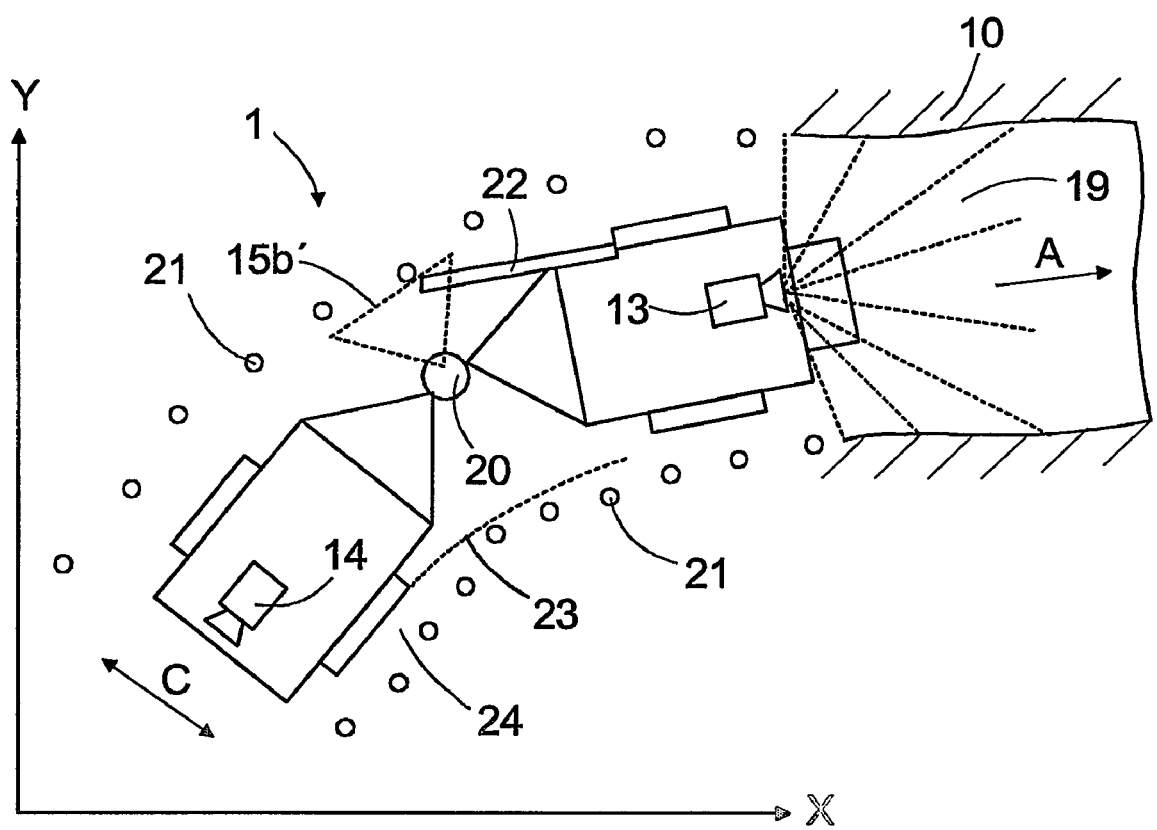

FIG. 4 illustrates how a collision examination may also be carried out for the "blind" areas of a mine vehicle 1, i.e. areas uncovered by a detection area 19 of a scanner 13. It is not always possible to place a sufficient number of scanners on a carrier 2 so as to enable the entire vehicle 1 to be included in the detection area 19 of the scanners. As far as collisions are concerned, the critical point may occur e.g. at a middle joint 20 of the articulated vehicle 1 since during a turn, the structures 22 of frame parts may extend quite far in a sideward direction C of the vehicle 1 so that they may hit an obstacle. Furthermore, it may occur within a blind area that during a sharp turn, the rear wheels of the vehicle 1 strongly take a short cut and collide with an obstacle. This is illustrated in the figure by a broken line 23. The critical points of the vehicle 1 may be provided with predetermined sideward safe areas of sizes different than those provided at less critical points. Hence, for instance, the size of a sideward safe area 15b' at the middle joint 20 may be larger than that residing over a section of the front frame and the rear frame. Furthermore, the sideward safe area may be larger on a first side of the vehicle than on a second side thereof e.g. due to the shape of the route to be travelled.

For a "second" examination of the blind areas, the environment in front of the vehicle is scanned and the wall surfaces of a mine gallery, large pieces of rock and other solid objects relevant to a collision are observed on both sides of the vehicle 1 while driving. The coordinates of the detection points closest in a sideward direction C are stored as memory points 21 in the X, Y coordinate system of the control system, coordinate system describing the working area of the vehicle 1. The memory points 21 define an obstacle-free route for safe travel. Each memory point 21 is stored in the memory of the control system for at least until the vehicle 1 has completely passed the particular memory point 21. In the second collision examination, the control system checks that each sideward safe area 15b always resides within the route defined by the memory points 21. In other words, it is ensured that no memory point 21 resides within the sideward safe area 15b.

The arrangement of the invention may be implemented such that the control system includes a "ring buffer" wherein the coordinates of the memory points 21 are stored. When the vehicle 1 is driven in a first movement direction A, the memory points 21 produced by the first scanner 13 for the collision examination with respect to the movement of the vehicle 1 are updated in the control system. Similarly, when reversing in a movement direction B, the memory points 21 produced by the second scanner 14 are updated for a sideward collision examination.

Furthermore, it is possible to utilize the collision examination in determining the steering parameters of a vehicle so as to avoid in advance potential violations of the sideward safe areas. The control system may in advance simulate, by calculation, steering situations and, when necessary, alter the steering parameters such that turning or another activity of the vehicle never causes a situation wherein a part of the vehicle is driven to the edge of the route defined by the memory points. This enables potential oversteppings of the safe area due to steering movements and the resulting disturbances to a production run to be avoided in advance. It may be necessary for such an examination to determine the turning angle of the vehicle 1. The control system may calculate the turning angle e.g. on the basis of navigation data or, alternatively, a sensor may be provided in connection with the wheels or the middle joint 20 to determine the turning angle. In addition, the control system may determine the positioning e.g. by means of direction and distance measurements.

The method of the invention may be executed by running a computer program in a processor of a computer belonging to the control system. The computer program implementing the method of the invention may be stored in the memory of the control system or the program may be downloaded into the computer from a memory means, such as a CD-ROM disc. Furthermore, the computer program may be downloaded from another computer e.g. through an information network to a device belonging to the control system of the mine vehicle.

Although only unmanned mine vehicles have been described above, it is naturally also possible to apply the collision examination of blind areas of the invention to completely common, manually controllable manned vehicles. The invention enables the safety of a manual machine to be improved and the work of an operator to be alleviated.

It is further possible that the safe areas 15a to 15c are updated according to the location of the mine vehicle 1. On the basis of the update, the dimensions and/or shape of the safe areas 15a to 15c in front of, on the sides of and/or behind the vehicle may be changed. The side areas 15a to 15c may then be smaller when travelling through the narrow sections of a mine and, on the other hand, they may be larger at points where the risk of collision is smaller. A possibility is that information on the size of the safe areas 15a to 15c is added to the route points of the route 11 travelled by the mine vehicle 1. Another possibility is that the route 11 travelled by the mine vehicle 1 is divided into sections, i.e. segments, larger than a route point. Update information may be determined for the segments. When the mine vehicle 1 arrives at such a route point or a segment, the control system may automatically update the safe areas. It is relatively easy to add update information in connection with the route points and segments and change it later. Yet another possibility is that the mine vehicle 1 identifies or receives update information on an external identifier during driving e.g. when it arrives at a critical point as far as safety is concerned. The mine may be provided e.g. with remote-readable identifiers or identifiers operating at a radio frequency that contain necessary update data.

The drawings and the related description are only intended to illustrate the idea of the invention. The details of the invention may vary within the scope of the claims.

The invention claimed is:

1. A method of preventing a mine vehicle from colliding, the mine vehicle comprising at least: a movable carrier that is driven in a first movement direction and in a second movement direction, at least one scanner, and a control system including at least a first control unit arranged on the carrier; the method comprising:

determining for the mine vehicle at least one safe area provided within an area between minimum distances and maximum distances determined with respect to the vehicle;

scanning the environment in front of the vehicle when driving the vehicle in one movement direction;

carrying out a first collision examination wherein the safe area in front of the vehicle is monitored, and issuing a collision warning message if an obstacle is detected within the safe area, determining also at least one sideward safe area for the vehicle, determining an obstacle-free route on the basis of the forward scanning results, and determining points in a sideward direction of the vehicle to restrict the route;

forming memory points on the basis of coordinates of the points restricting the route, and storing the memory points in the control system, and carrying out a second collision examination wherein at least one sideward safe area of the vehicle is monitored, and issuing a collision warning message if even one of the memory points resides within the safe area being monitored.

2. A method as claimed in claim 1, comprising simulating in advance, on the basis of position and control data, the path of movement of at least one part of the vehicle in the control system, carrying out the second collision examination by taking into account the path of movement obtained by simulation, and adjusting, on the basis of the second collision examination, steering movements of the vehicle in order to avoid overstepping the sideward safe area.

3. A method as claimed in claim 1, comprising storing substantially continuously the memory points in a ring buffer provided in the control system, and updating for the second collision examination the memory points in a ring memory with respect to the movement of the vehicle.

4. A method as claimed in claim 1, comprising controlling the vehicle unmannedly, and utilizing for such control a data transmission connection provided between the first control unit residing on the carrier of the vehicle and a second, external control unit.

5. A method as claimed in claim 1, comprising
updating dimensions of at least one safe area on the basis of the location of the mine vehicle.

6. A mine vehicle comprising at least:
a movable carrier that is driven in a first movement direction and in a second movement direction,
at least one scanner,
a control system including at least a first control unit arranged on the carrier;
and wherein
at least one scanner is configured to scan the environment in front of the vehicle in order to detect obstacles;
at least one safe area defined by minimum distances and maximum distances determined with respect to the vehicle is determined in the control system;
and which control system is configured to monitor scanning results and to issue a collision warning message if an obstacle is detected within the safe area in front of the vehicle,
and wherein
in the control system, at least one safe area in a sideward direction of the vehicle is further determined,
the control system allows several memory points including their position information to be stored therein the memory points defining sideward points of the route and based on the forward scanning results,
and the control system is configured to monitor at least one sideward safe area of the vehicle and to issue a collision warning message if even one of the memory points resides within the safe area being monitored.

7. A mine vehicle as claimed in claim 6, wherein
the mine vehicle comprises a first laser scanner directed in a first movement direction and a second laser scanner directed in a second movement direction,
and wherein each movement direction is provided with a safe area of its own.

8. A mine vehicle as claimed in claim 6, wherein
the minimum distances of the safe area are determined according to the external shape and structure of the mine vehicle.

9. A mine vehicle as claimed in claim 6, wherein
the mine vehicle is unmanned,
and wherein the first control unit is through a data transmission connection connected to a second, external control unit in order to transfer control data between the control units.

10. A mine vehicle as claimed in claim 6, wherein the control system is configured to update at least one safe area on the basis of the location of the mine vehicle.

11. A method of preventing a mine vehicle from colliding, the mine vehicle comprising at least: a movable carrier that is driven in a first movement direction and in a second movement direction, at least one scanner, and a control system including at least a first control unit arranged on the carrier; the method comprising:

determining for the mine vehicle at least one safe area provided within an area between minimum distances and maximum distances determined with respect to the vehicle;
scanning the environment in front of the vehicle when driving the vehicle in one movement direction;
carrying out a first collision examination wherein the safe area in front of the vehicle is monitored, and issuing a collision warning message if an obstacle is detected within the safe area,
determining also at least one sideward safe area for the vehicle, determining an obstacle-free route on the basis of the forward scanning results, and determining points in a sideward direction of the vehicle to restrict the route;
forming memory points on the basis of coordinates of the points restricting the route, and storing the memory points in the control system,
and carrying out a second collision examination wherein at least one sideward safe area of the vehicle is monitored, and issuing a collision warning message if even one of the memory points resides within the safe area being monitored, and wherein the mine vehicle is stopped when the collision warning message is issued.

12. A mine vehicle comprising at least:
a movable carrier that is driven in a first movement direction and in a second movement direction,
at least one scanner,
a control system including at least a first control unit arranged on the carrier;
and wherein
at least one scanner is configured to scan the environment in front of the vehicle in order to detect obstacles;
at least one safe area defined by minimum distances and maximum distances determined with respect to the vehicle is determined in the control system;
and which control system is configured to monitor scanning results and to issue a collision warning message if an obstacle is detected within the safe area in front of the vehicle,
and wherein
in the control system, at least one safe area in a sideward direction of the vehicle is further determined,
the control system allows several memory points including their position information to be stored therein the memory points defining sideward points of the route and based on the forward scanning results,
and the control system is configured to monitor at least one sideward safe area of the vehicle and to issue a collision warning message and to stop the mine vehicle if even one of the memory points resides within the safe area being monitored.

* * * * *